Dec. 31, 1940.    J. VAN BRUNT    2,226,955

SLAGGING FURNACE

Filed Jan. 13, 1940

INVENTOR
JOHN VAN BRUNT.

BY
ATTORNEY

Patented Dec. 31, 1940

2,226,955

UNITED STATES PATENT OFFICE 2,226,955

SLAGGING FURNACE

John Van Brunt, Flushing, N. Y., assignor to Combustion Engineering Company, Inc., New York, N. Y.

Application January 13, 1940, Serial No. 313,696

3 Claims. (Cl. 122—235)

This invention relates to improvements in furnaces having a floor or bottom on which hot fluid slag is supported.

The invention is particularly applicable to the furnaces of boilers fired with pulverized coal in which the ash is maintained on the bottom as a hot fluid slag and is tapped or drained off through slag discharge openings. When hot fluid slag is being drained off the cumulative heat of the slag flowing from the entire bottom area becomes concentrated at the place of discharge and consequently the heat flow from the slag to the material forming the edges of the discharge opening is very great. Consequently, suitable means must be provided against the destruction of the opening by the hot slag and for this purpose water cooled edges have heretofore been provided around the slag discharge opening, the water being obtained from the usual sources, such as the service supply or from a connection into the circulation of the boiler. There are objections to the use of such waters, in that the usual water supply, whether taken from city service, well, lake, etc., may contain salts which will deposit as scale in the structure at the periphery of the slag discharge opening thus interfering with the cooling thereof and resulting in its failure if the scale is not adequately removed. Either the failure due to overheating or the shut down for scale removal are objectionable interruptions to the boiler service. There is the further danger of failure in the use of a water supply that is independent of the boiler operation. The use of the cooling water from condenser is objectionable because it may be contaminated with salts.

When using cooling waters from sources independent of the boiler operation, independent pumps are required for their delivery to the cooling structure and all of the heat absorbed in cooling is wasted. By connecting the cooling structure into the natural circulation of the boiler water, many of the above objections are overcome but the water partly vaporizes into steam within the structure and it has been found that insufficient water may flow therethrough to adequately cool it.

An object of the invention is to provide an improved means for cooling those portions of the bottom of such furnaces over which the hot fluid slag flows when discharging.

According to this invention, I supply the cooling water from a source that is dependent upon the boiler operation, is ample in amount to properly cool the slag opening structure, will not steam and is of a purity that overcomes the objectionable scale deposit therein.

How the foregoing together with such other objects and advantages as may hereinafter appear or are incident to my invention are realized is illustrated in preferred form in the accompanying drawing, wherein.

Figure 3:
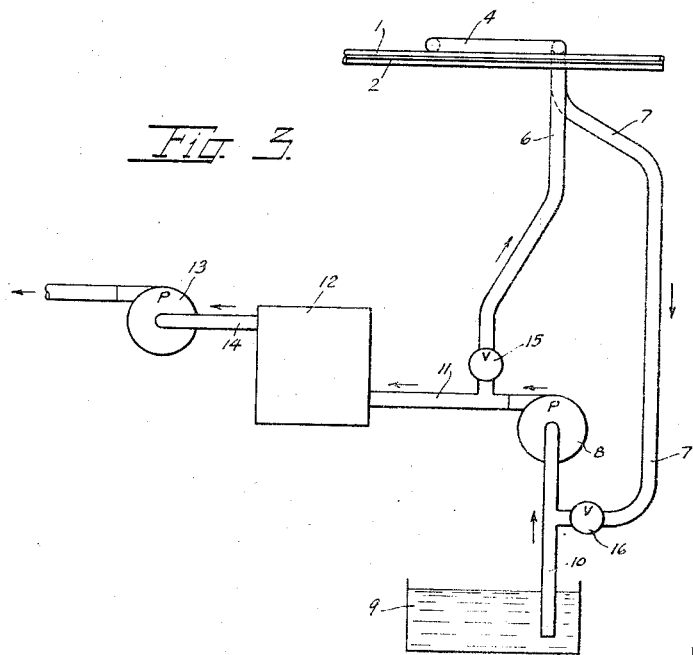

Fig. 3 diagrammatically shows the hookup of the cooling means for the slag discharge opening.

Figure 1:
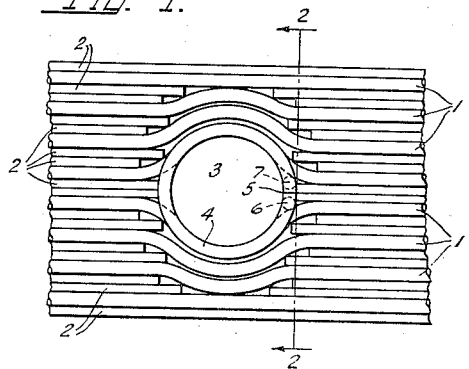
Fig. 1 is a fragmentary plan view of the floor of a boiler furnace constructed to support fluid slag.
Figure 2:
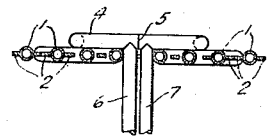
Fig. 2 is a vertical section on line 2—2 of Fig. 1.

In the drawing the tubes 1 form the floor of a boiler furnace, each tube being provided with extended surfaces or fins 2 which substantially close the spaces therebetween except where certain tubes are spread to form the slag discharge opening 3. The omission of the fins becomes necessary at this location because the tubes are drawn more closely together so that there is no room remaining for the fins, as may be seen from Fig. 1. Surrounding the slag discharge opening 3 is a tube 4 bent to conform to the shape of the opening, in this instance a circular coil. At one side tube 4 is provided with a vertical partition 5 so as to form an inlet and an outlet orifice to which are connected, as by welding, tubes 6 and 7 for conducting cooling water to and from tube 4. The pump 8 shown in Fig. 3 represents the stage or so-called booster pump of the boiler taking feed water from a hot well 9 through a suction pipe 10 and delivering it via a pipe 11 to a feed water heater or heaters 12. Boiler feed pump 13 takes the feed water from heater 12 through pipe 14 and delivers it to the boiler (not shown).

The tube coil 4 at the slag discharge opening is raised above the general level of the floor tubes 1 so as to serve as a dam to prevent heat resisting materials which may be placed upon tubes 1, for the purpose of forming a slag supporting bed, from flowing down through the slag discharge opening when in a hot plastic state. Such a dam is disclosed in my co-pending application Serial No. 277,380, filed June 5, 1939.

According to the invention I deliver some of the water discharged from pump 8 via pipe 6 to tube coil 4 for cooling the same and return the water from tube coil 4 via tube 7 to the suction line 10 of pump 8. Suitable valves 15 and 16 are provided to control the flow of water through this circuit.

In a feed water system of a modern condensating plant it is possible to take water from some point in the system where the pressures are about 40# to 150# and the temperatures from 100 deg. to 150 deg. F. In this instance these conditions may be met by taking water from the booster pump discharge, circulating it through coil 4 and thence either back to the pump suction or hot well. The pressure difference between the inlet and discharge of the booster pump will be sufficient to give the required flow of cooling water. The advantages of using the water from the hot well lie in that it is mostly condensate which is of desirable purity for use in coil 4 and avoids scale deposit therein. The connection into the feed pump circuit for cooling water to coil 4 assures a continuous and reliable supply of water thereto whenever the boiler is in operation. With the cooling water at a temperature of about 150 deg. F. the cooling of coil 4 can be effected without the generation of any steam therein. Further the heat absorbed in the coil is returned to the feed water and with the temperature and velocity of the water through the coil, corrosion is avoided. In general the cooling water may be taken at any point in the feed water circuit where the temperature is about 50 deg. or more below the saturation temperature of steam corresponding to the pressure at that point.

What I claim is:

1. In a steam boiler having a furnace for burning slag forming fuel provided with a bottom formed with a liquid slag discharge opening extending therethrough; tubular means located at the edge of said opening and over which the slag flows when discharging therethrough; a source of supply of boiler feed water for the boiler treated to minimize scale and corrosion; a pump for taking water from said source and delivering it to said boiler; and a connection from the delivery side of said pump to said tubular means for circulating a portion of said feed water therethrough.

2. In a steam boiler having a furnace for burning slag forming fuel provided with a bottom formed with a liquid slag discharge opening extending therethrough; tubular means located at the edge of said opening and over which the slag flows when discharging therethrough; a source of supply of boiler feed water for the boiler treated to minimize scale and corrosion; a pump for taking water from said source and delivering to to said boiler; and piping interconnecting the delivery and suction sides of said pump and having said tubular means interposed therein for circulating a portion of said feed water therethrough.

3. In a steam boiler and its furnace for burning slag forming fuels, the combination of a steam boiler; a furnace bottom constructed to support hot liquid slag; an opening through said bottom for the discharge of said slag therethrough; tubular means provided at the edges of said opening over which said slag flows when discharging through said opening; a stage pump for delivering suitably treated feed water to said boiler; a connection from the pump discharge to said tubular means for delivering a portion of said feed water to said means for cooling it; a connection from said tubular means to the pump suction, the pressure, temperature and amount of the water delivered to the tubular means being such that the water will not form steam within the tubular means.

JOHN VAN BRUNT.